(12) United States Patent
Jaeger et al.

(10) Patent No.: US 7,066,525 B2
(45) Date of Patent: Jun. 27, 2006

(54) WISHBONE SHAPED VEHICLE BUMPER BEAM

(75) Inventors: Walter D. Jaeger, Lake Angelus, MI (US); Jeff L. Bladow, West Bloomfield, MI (US)

(73) Assignee: Pullman Industries, Inc., Troy, MI (US)

( * ) Notice: Subject to any disclaimer, the term of this patent is extended or adjusted under 35 U.S.C. 154(b) by 0 days.

(21) Appl. No.: 10/786,728

(22) Filed: Feb. 25, 2004

(65) Prior Publication Data
US 2004/0164566 A1    Aug. 26, 2004

Related U.S. Application Data

(60) Provisional application No. 60/450,221, filed on Feb. 25, 2003.

(51) Int. Cl.
B60R 19/02    (2006.01)
(52) U.S. Cl. .................................. 296/102; 293/120
(58) Field of Classification Search ............... 293/102, 293/120, 122
See application file for complete search history.

(56) References Cited

U.S. PATENT DOCUMENTS

| 3,877,741 | A | * | 4/1975 | Wilfert et al. ............... 293/132 |
| 4,440,429 | A | * | 4/1984 | Eyb ............................. 293/120 |
| 4,762,352 | A |   | 8/1988 | Enomoto ...................... 293/120 |
| 5,080,410 | A |   | 1/1992 | Stewart ....................... 293/102 |
| 5,418,350 | A |   | 5/1995 | Freneaux ................. 219/121.84 |
| D373,557  | S | * | 9/1996 | Shaw et al. ............. 280/402 X |
| 6,185,978 | B1|   | 2/2001 | Sundgren ...................... 72/364 |
| 6,349,521 | B1|   | 2/2002 | McKeon ..................... 52/735.1 |
| 6,352,297 | B1|   | 3/2002 | Sundgren et al. ........... 296/102 |
| 6,428,031 | B1| * | 8/2002 | McCoy et al. .............. 280/495 |
| 6,454,884 | B1|   | 9/2002 | McNulty ..................... 148/520 |
| 6,685,244 | B1| * | 2/2004 | McCoy et al. .............. 293/102 |
| 6,709,036 | B1| * | 3/2004 | Evans ......................... 293/120 |
| 2003/0164619 | A1 | | 9/2003 | Frank ......................... 293/102 |
| 2004/0007886 | A1 | | 1/2004 | Hallergren ................... 293/102 |

FOREIGN PATENT DOCUMENTS

WO       WO 02/33132 A1      4/2002

* cited by examiner

Primary Examiner—Joseph D. Pape
(74) Attorney, Agent, or Firm—Gifford, Krass, Groh, Sprinkle, Anderson & Citkowski, P.C.

(57) ABSTRACT

A bumper beam and method of manufacture which includes roll-forming the bumper beam with a constant longitudinal cross section, and then reforming the roll-formed beam to form a tubular bumper beam having a constant area. The bumper beam area is designed to incorporate a longitudinal "curvature" to form angular surfaces consistent with many modern automobile fascias, thereby, enabling high impact absorption efficiency.

8 Claims, 1 Drawing Sheet

WISHBONE SHAPED VEHICLE BUMPER BEAM

BACKGROUND OF THE PRESENT INVENTION

The present invention relates to bumper impact system designs for motor vehicles that are required to meet all or part of the Federal Motor Vehicle Safety Standards and Insurance Institute for Highway Safety guidelines for bumpers. These designs are driven by the need to absorb as much impact energy as possible in the shortest distance possible (stroke) for purposes of keeping the package size of the bumper system reasonable. In addition, it has been found desirable to absorb as much energy as possible with the least system mass (optimized "specific energy") in order to minimize bumper impact system mass, always a mandate with today's strict emission standards.

Typical bumper performance is based on its ability to protect a vehicle. A typical bumper design usually consists of a profile or closed section that reaches across a vehicle transverse to its usual direction of travel. The bumper may be disposed at either the front or rear of a vehicle. The following description refers to a front bumper, but should be considered applicable to a rear bumper as well.

A conventional bumper beam/fascia assembly consists of a specific vehicle-designed fascia (plastic), filler (foam), then a bumper beam (steel or equivalent) that is to be mounted horizontally at the end of the vehicle, to the front ends of the side rails of the vehicle. The mounting of the bumper beam at the side rails may be accomplished by any chosen method.

With the bumper beam mounted onto the vehicle, its main task is to help meet, distribute, and dissipate the energy that is absorbed during a collision between the vehicle and another object. The bumper beam should mainly address and mitigate those forces that act on the vehicle during a collision directly from the front or rear or obliquely from the front or rear. Improved performance is attained by moving the beam (armature) edge as close as possible to the vehicle exterior surface. Foam or other material is used to fill gaps between the bumper beam and the fascia that typically exists, which adds extra cost and limits performance. Therefore, further improvements on the bumper beam design are desirable.

SUMMARY OF THE PRESENT INVENTION

The present invention relates to a "Wishbone Beam" design for an automotive bumper which allows bumper contact with an impactor (testing device or impacting vehicle) as early as possible in the impact "event." This is achieved and by curving the center section of the bumper in a forward direction outward towards the fascia. This curve is preferably achieved by forming symmetrical bends in the bumper at two sections, each intermediate the center of the bumper and one of the opposite ends. Each bend, starting nearest one of the bumper ends, arrives first forwardly and then transversely toward the center of the bumper. This results in a center section located forwardly of the two end sections. As a result, enhanced impact performance occurs due to the energy absorbing properties of the beam. The beam design of the present invention requires less package space or depth (between the rail ends and the fascia) and in order to absorb the same amount of energy as a typically mounted bumper profile.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENT

Figure 1:
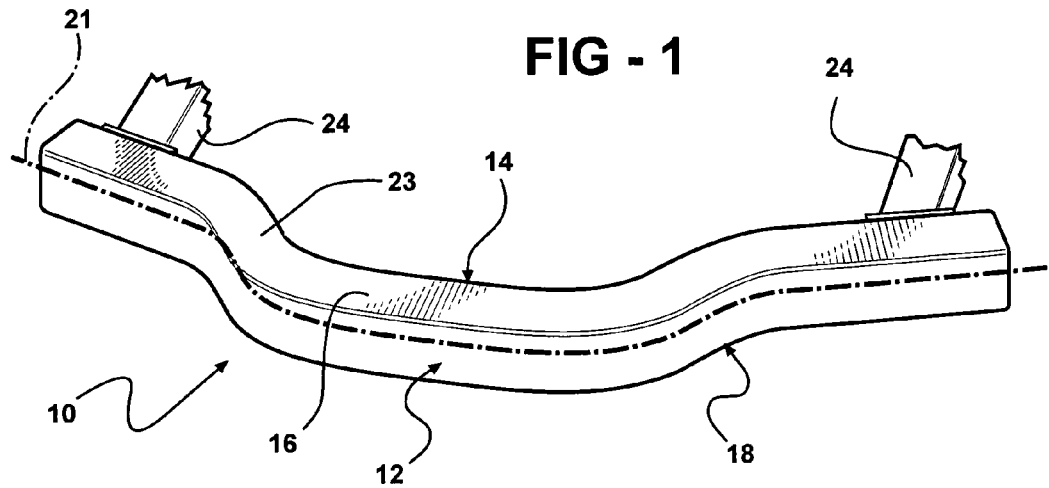
FIG. 1 is a perspective view of a roll-formed bumper beam representing a preferred embodiment of the present invention attached to an end of a vehicle's frame.

Referring to FIG. 1, a preferred embodiment of the present invention comprises a roll-formed beam 10 having a constant longitudinal cross section, which is then reformed after rolling, in a press or the like, to achieve a tubular bumper beam having a constant (or non-constant) cross section. The present invention may also employ an additional process, such as a cold-twist, hot-twist, fixture-forming, hydro-forming, or other known reforming processes. In alternative embodiments of the invention, the beam 10 may be formed with a cross-section which varies along the length of the beam. The variation in the cross-section may be achieved in the rolling process or the reforming process.

Figure 2:
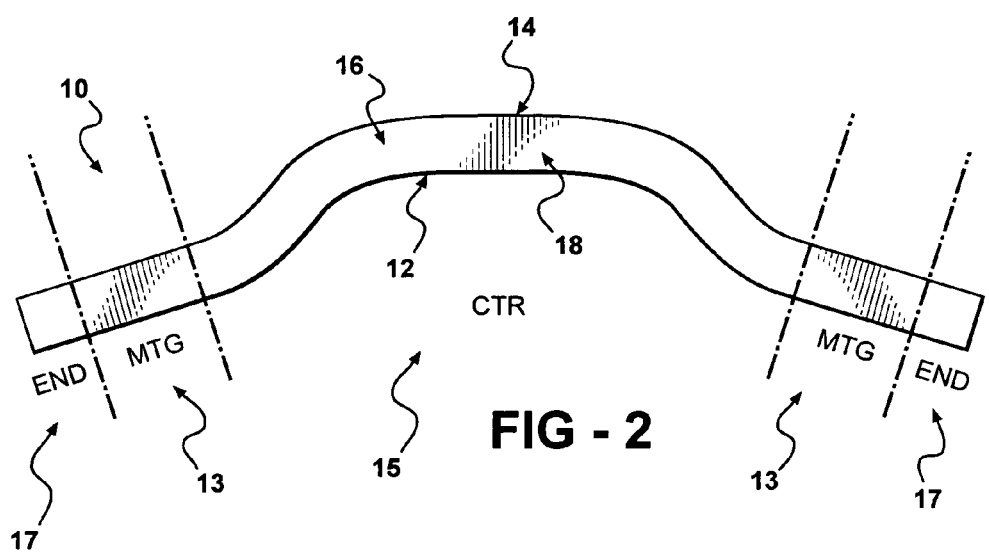
FIG. 2 is a top plan view of the roll-formed bumper beam of FIG. 1.

The present invention may also take the form of a solid beam rather than a tubular structure. The reshaped roll-formed beam 10 includes front 12, rear 14, top 16, and bottom 18 walls, respectively. Referring further to FIG. 2, the roll-formed beam includes a horizontal center section (CTR) 15, a mounting sections (MTG) 13 on each side of the center section (CTR) 15, and outer end sections (END) 17 on each side of the mounting sections MTG 13.

Referring again to FIG. 3, the roll-formed bumper beam 10 exhibits a closed and constant section beam with profile changes in its plan view about the longitudinal axis 21. Once the beam is reformed, the roll-formed beam's profile is changed in the plan view to achieve a curvature shown by the dashed line 23. These profile changes in the reshaped roll-formed bumper beam 10 (FIG. 1) thus provide the ability to allow the appropriate curvature in the central section CTR of the beam, while still providing square (or near-square) mounting sections MTG towards the outer end sections END for purposes attachment in any convenient manner to the ends 24 of the vehicle side rails (FIG. 1).

The reshaped roll-formed beam 10 is formed in one longitudinal direction axis 21 and shaped as a tube with a preferred closed cross-section. Referring again to FIG. 2, the bumper beam 10 exhibits the central section CTR 15. It is here that the center section CTR 15 of the bumper beam can be gradually "swept" longitudinally to mimic the vehicle's fascia profile.

FIG. 2 is a plan view of bumper beam 10, showing the "wishbone" beam profile that contains a smaller curvature towards the centerline and a larger curvature contained near the mounting sections MTG 13. The area at the mounting sections 13 is preferably square in order to mate to the vehicle's side rails 24.

Figure 3:
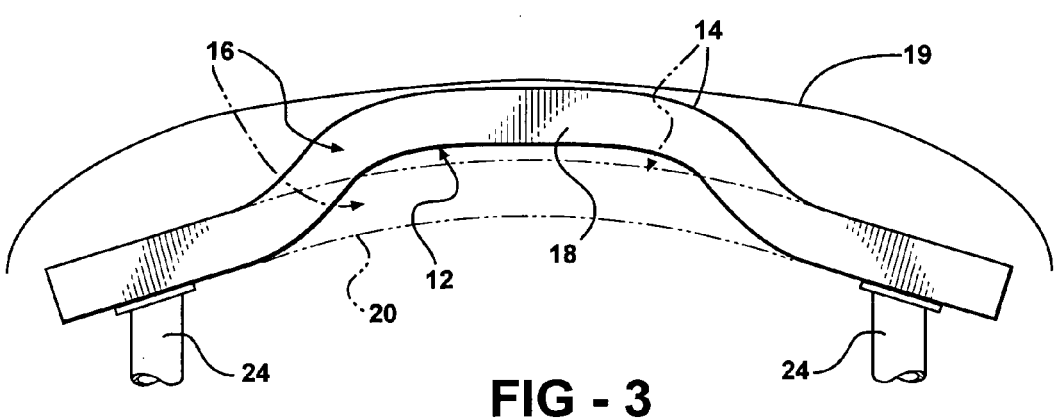
FIG. 3 is a plan view of the bumper of FIG. 1, illustrated in comparison to a typical roll-formed bumper beam, and as they relate to the vehicle's fascia.

Inward of the mounting sections 13, the beam 10 is curved outward towards the vehicle's fascia as at 19 in FIG. 3. A transition occurs from the outward curvature to an inward curvature at the beam's "inflection" point. The inward curve of bumper beam 10 creates the attribute of "matching" or "mimicking" all or portions of the vehicle's fascia profile.

Typically, a vehicle's bumper beam is further limited by its square or near-square mounting areas, as illustrated in FIG. 2. The benefit of the "wishbone" design is again illustrated in FIG. 3, with a "Dashed Line" representing the plan view of a "typical" rolled-formed then swept bumper beam 20 and the "Solid Line" again representing the plan view 18 of the roll-formed "wishbone" bumper beam, both in relation to the vehicle's fascia profile.

The "Dashed Line" representation of the "typical" bumper beam 20 is an example of a roll-formed bumper beam that is reformed with a "simple" sweep. A "simple" sweep is defined herein as a beam with a constant or near-constant gradual curvature.

The "Solid Line" 18 representation of the "wishbone" bumper beam 10 is an example of a roll-formed bumper beam that is reformed with a complex, reverse curvature, sweep. A reverse curvature sweep is defined herein as a beam with multiple constant or non-constant curvatures that "reverse" their direction at a minimum of two points resulting in corresponding inflection points.

As a result of the "wishbone," the beam's area at the center section CTR 15 is closer to the impact point, allowing more effective crush. This allows the bumper beam to be designed for each unique vehicle and also allow the bumper's Force vs. Displacement curve to be tuned to a desired result.

The shape of the roll-formed bumper beam can be altered at the sections 15, 13, or 17 in order to make the mounting of the beam onto the vehicle. The change of the shape is achieved in a controlled manner, for example in a forming tool. It is optional to weld the roll-formed bumper beam to form a tubular beam through the center section 15, the mounting sections 13, and continuing to the outer end sections 17.

It should be noted that FIG. 1 is only one desired "wishbone" of many that are possible in accordance with the present invention. The "wishbone" and preferred welding creates a bumper beam has different energy absorbing properties in the center section that has in its outer end sections 17. The region of the optional welded joint constitutes a clear rotational guide for the bumper beam during a collision. The bumper beam will be more easily broken in its center and in this way absorbs large amounts of energy.

In application, the roll-formed bumper beam 10 (FIG. 1) is to be mounted horizontally at the end or front of the vehicle, at the front ends of the sidebars 24 of the vehicle. The mounting of the bumper at the sidebars takes place with a freely-chosen method within the skill of one in the relevant art. When the bumper beam has been mounted onto the vehicle, its main task is to meet, distribute, and dissipate the energy that is absorbed during a collision between the vehicle and another object. It is further contemplated that the bumper beam should mainly absorb those forces that act on the vehicle during a collision directly from the front or obliquely from the front.

A preferred method for manufacturing the bumper beam of the present invention comprised by feeding a flat sheet of steel into a roll-forming device. The sheet is shaped into a tubular extended element with a closed cross-section in the roll-forming device. After rolling, the edges of the slate are abutting one another. The preferred closed cross-section is obtained by spot-welding the edges of the rolled section by spot-welding, seam welding, or a similar method.

The roll-forming device can shape bends, or longitudinal grooves in a sheet in order to make the further shaping of the bumper beam possible, and also to improve the final torsional rigidity, flexural rigidity, and other properties of the bumper beam that take up forces during a collision. Before the roll-forming is commenced, the sheet can be cut into suitable lengths which ensures that the final length of the bumper beam is as desired. The sheet can also be cut after the roll-forming operation.

After these operations, the bumper beam is placed in an oven and heated to a suitable austenitizing temperature for the material. Once the bar has reached the correct temperature, it is placed in a combined forming and quenching tool.

In this tool, the roll-formed bumper beam is shaped along the horizontal axis by bending. The bumper beam is completely straight when it comes out from the roll-forming device. The front of a vehicle's fascia is often bent backwards out towards the sides of the vehicle in order to reduce air resistance, to improve the properties for absorbing collision forces and to make the appearance attractive. The bumper beam should have an equivalent bend in order to optimize the use of available space. The ends of the bumper beam are bent backwards with the same forming tool that carries out the pressing together.

After the shaping, the bumper beam is quenched, still located in the forming tool. This method provides a bumper beam that is constructed in one piece and that only requires one roll-forming device and only one further forming device, which shapes the details and at the same time provides the bumper beam with the stability during quenching.

The reshaped roll-formed bumper beam 10 construction has an optional closed profile whose geometry is varied across a vehicle typically made by roll forming. This bumper construction maybe "canted" forward or rearward at the centerline, or at ends or at any position that allows the bumper to better fit the space underneath the vehicle exterior (the beam is canted forward or rearward as related to its mounting points).

It is within the scope of the present invention to have other solutions and detailed designs of the certain parts of the bumper beam. The number, appearance, and construction of the grooves and bends can be varied and complemented in order to control and vary the collision properties of the bumper beam.

We claim:

1. A tubular bumper beam for a motor vehicle, said bumper beam comprising:
   a first and a second end section, each end section being disposed proximate a respective end of said beam;
   a center section which is disposed between said first and second end sections;
   a first mounting section which is disposed between said center section and said first end;
   a second mounting section which is disposed between said center section and said second end;
   said beam defining a longitudinal axis passing from said first end section to said second end section, said axis being curved along a sweep line so that said beam is a curved beam, and said first end section and said second end section are not linearly aligned; said axis including a first inflection point disposed between said first mounting section and said central portion, and a second inflection point disposed between said second mounting section and said central portion so that said central section is displaced forward of said first and second mounting sections and said first and second end sections.

2. The beam of claim 1, wherein said beam is a roll-formed beam.

3. The beam of claim 1, wherein said beam is fabricated from steel.

4. The beam of claim 3, wherein said steel has been subjected to a hardening process.

5. The beam of claim 1, wherein the cross section of said beam along said axis is constant.

6. The beam of claim 1, wherein the cross section of said beam along said axis is not constant.

7. The beam of claim 1, wherein said beam is twisted along said axis.

8. A bumper assembly, said bumper assembly comprising the beam of claim 1, and further including a fascia member which encloses at least a portion of said beam.

* * * * *